United States Patent [19]

Makino et al.

[11] Patent Number: 4,912,882
[45] Date of Patent: Apr. 3, 1990

[54] METHOD OF REDUCING LATERAL FORCE VARIATION OF TIRE

[75] Inventors: Hisao Makino, Kodaira; Akira Ishibashi, Tanashi, both of Japan

[73] Assignee: Bridgestone Corporation, Tokyo, Japan

[21] Appl. No.: 232,832

[22] Filed: Aug. 16, 1988

[30] Foreign Application Priority Data

Aug. 20, 1987 [JP] Japan .................................. 62-204975
Jul. 12, 1988 [JP] Japan .................................. 63-171900

[51] Int. Cl.$^4$ .............................................. B24B 49/16
[52] U.S. Cl. .............................. 51/165 R; 51/281 R; 51/106 R; 51/DIG. 33
[58] Field of Search ............ 51/106 R, 165 R, 165.71, 51/281 R, DIG. 33; 73/146

[56] References Cited

U.S. PATENT DOCUMENTS

| | | | |
|---|---|---|---|
| 3,473,422 | 10/1969 | Leblond | 73/146 |
| 3,527,103 | 10/1967 | Hale et al. | 73/146 X |
| 3,739,533 | 6/1973 | Iida | 51/281 R |
| 3,946,527 | 3/1976 | Beer | 51/281 R |
| 3,948,004 | 4/1976 | Gruber | 51/165 R |
| 4,018,087 | 4/1977 | Wenz | 73/146 |
| 4,047,338 | 9/1977 | Gormish | 51/106 R |
| 4,112,630 | 9/1978 | Brown, Jr. | 51/281 R |
| 4,128,969 | 12/1978 | Gormish et al. | 51/165 R X |
| 4,458,451 | 7/1984 | Rogers et al. | 51/165 R |

FOREIGN PATENT DOCUMENTS

| | | |
|---|---|---|
| 54-83975 | 7/1979 | Japan . |
| 54-83976 | 7/1979 | Japan . |
| 60-34452 | 8/1985 | Japan . |
| 61-23105 | 6/1986 | Japan . |

Primary Examiner—Robert P. Olszewski
Attorney, Agent, or Firm—Sughrue, Mion, Zinn, Macpeak & Seas

[57] ABSTRACT

A method of reducing the lateral force variation of a tire by grinding one of the shoulders of tire over a semicircle thereof and the other shoulder over a remaining semicircle in accordance with grinding amount and grinding position. In order to derive the grinding amount and grinding position, the lateral force is detected over one revolution of the tire to derive a measured waveform of the lateral force of the tire, the measured waveform is transformed to derive a factor waveform in the causation of the lateral force, while the first-order time lag of the tire is taken into account, and then the grinding amount and grinding position are determined from the thus derived factor waveform in the causation of the lateral force of the tire.

10 Claims, 1 Drawing Sheet

METHOD OF REDUCING LATERAL FORCE VARIATION OF TIRE

BACKGROUND OF THE INVENTION

Field of the Invention and Related Art Statement

The present invention relates to a method of reducing the lateral force variation of a pneumatic tire.

When a tire is rotated, there are produced various kinds of forces. Among these forces is a force generated in a lateral direction termed a lateral force which is sometimes abbreviated as LF. A variation of this lateral force over one revolution is called a lateral force variation which is generally abbreviated as LFV. In order to improve the property of the tire, the lateral force variation has to be reduced.

There have been proposed several methods for reducing LFV of the tire. For instance, in Japanese Patent Publication No. 60-34,452, there is disclosed a method of reducing LFV. In this method, a tire is rotated in one direction and LF values are measured at many points along the circumference of tire and are stored. Then, the tire is rotated in an opposite direction to measure values of LF. Then, algebraic sums of these LF values at corresponding measuring points are derived, and an amount and a position of grinding the tire are determined in accordance with said algebraic sums.

In Japanese Patent Publication No. 61-23,105, there is disclosed another known method, in which a tire is rotated in one direction to measure LF, then a first harmonic is derived from the measured LF waveform, and the tire is ground on the basis of the first harmonic of the measured waveform of LF.

It has been generally recognized that LFV is a composite of the conicity component whose direction is not changed in accordance with the rotational direction of the tire and the plysteer component whose direction is inverse depending upon the rotational direction. In general, the. method of reducing LFV is to grind the tire locally such that the conicity component is reduced.

In the known method described in the above mentioned Japanese Patent Publication No. 60-34,452, the tire is ground in accordance with the sum of the forward and backward lateral forces which represents the conicity component, so that it has been considered that the LFV of the tire could be reduced. However, in practice, this known method could not reduce LFV of the tire efficiently and sometimes LFV of the tire becomes worse by the grinding operation. The inventors have investigated this phenomenon and have found that the tire has inherently a time lag characteristic so that measured waveform of LF is delayed with respect to a factor waveform in the causation of the lateral force. Therefore, it is impossible to derive the conicity component accurately from the algebraic sum of the forward and backward lateral forces and LFV of the tire could not be corrected accurately.

FIG. 1 shows the measured waveforms A and B of the forward and backward lateral forces of the tire. When these LFV values at corresponding points on the tire are summed, the LFV values are canceled out to derive a summed waveform C. Then it is difficult to determine the grinding amount and grinding position of the tire from the waveform C.

Further, in the known method disclosed in the Japanese Patent Publication No. 61-23,105, since the tire is ground in accordance with the LF waveform derived by rotating the tire only in one direction, the LFV might be increased by the grinding. Moreover, also in this known method, the time lag characteristic of the tire is not taken into account.

Recently there has been used a uni-directional tire whose rotational direction is specified or destined. In this uni-directional tire, it is not necessary to separate the lateral force into the conicity and plysteer components and it is sufficient to reduce the lateral force variation when the tire is rotated in the specified direction. Therefore, the method described in the Japanese Patent Publication No. 61-23,105 could be advantageously applied to the uni-directional tire. However, also in this known method, since the time lag of the tire is not taken into account at all, LFV could not be corrected accurately, and sometimes LFV might be increased by grinding the tire.

SUMMARY OF THE INVENTION

The present invention has for its object to provide a novel and useful method of reducing the lateral force variation of the tire, in which the lateral force variation can be accurately reduced by taking into account the first-order time lag of the tire.

It is another object of the invention to provide a method of reducing the lateral force variation of the uni-directional tire.

According to the invention, a method of reducing a lateral force variation of a tire comprises the steps of:
rotating the tire at a constant velocity;
detecting a lateral force of the tire over one revolution of the tire to derive a measured waveform of the lateral force of the tire;
Fourier transforming the measured waveform of the lateral force to derive a Fourier series of the measured waveform of the lateral force of the tire;
correcting the Fourier series of the measured waveform of the lateral force of the tire by taking into account a first-order time lag of the tire to derive a factor waveform in the causation of the lateral force of the tire;
determining a grinding amount and a grinding position from the factor waveform in the causation of the lateral force of the tire; and
grinding the tire to cut off rubber from shoulders of the tire in accordance with the grinding amount and grinding position.

In a preferred embodiment of the method according to the invention, only the first harmonic of the Fourier series is corrected in accordance with the first-order time lag of the tire to derive the factor waveform in the causation of the lateral force.

The method according to the invention has been effected by recognizing the following fact. The time lag characteristic of the tire can be approximated by the first-order time lag, so that the measured waveform of LF is obtained by passing the factor waveform in the causation of the lateral force through a first-order delay element. Therefore, the factor waveform in the causation of the lateral force can be derived by inversely passing the measured waveform of the lateral force through the first-order delay element. Then, the tire is ground in accordance with the thus derived factor waveform of the lateral force. In this manner, the lateral force variation of the tire can be reduced accurately and efficiently.

BRIEF EXPLANATION OF THE DRAWINGS

FIG. 2 is a block diagram illustrating an apparatus for carrying out the method according to the invention; and.

DESCRIPTION OF THE PREFERRED EMBODIMENTS

Figure 2:
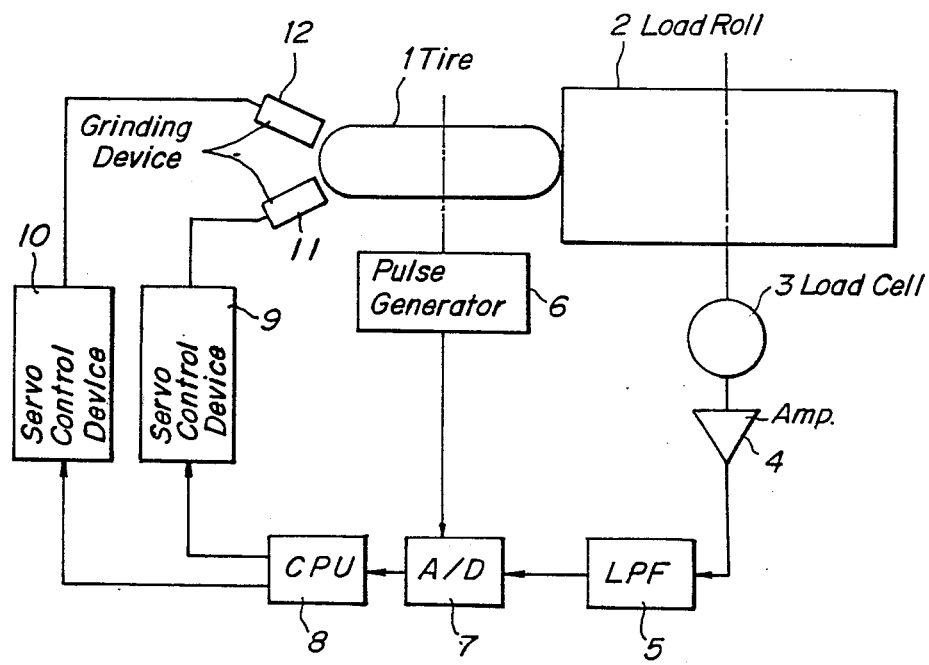

FIG. 2 is a block diagram illustrating an embodiment of the apparatus for carrying out the LFV reducing method according to the invention. A pneumatic tire 1 is filled with air at a specified pressure and is urged against a load roll 2. The load roll 2 is rotated in a given direction by means of a suitable driving means not shown. During the rotation, the lateral force (LF) is produced by the rotating tire 1 and is detected by a load cell 3 coupled with the load roll 2. An output signed from the load cell 3 is amplified by an amplifier 4 and then is passed through a low pass filter (LPF) 5 to remove noise contained therein. A pulse generator 6 is secured to a rotational shaft of the tire 1 and generates sampling pulses at every predetermined rotational angle of the tire. By using the sampling pulses, the output signal from the low pass filter 5 is sampled in an A/D converter 7 to derive digitalized LF data, which is then stored in a memory provided in a computer 8. In this manner, the LF data of a forward revolution of the tire 1 is stored in the computer 8. Next, the tire 1 is rotated in the backward direction and LF data of backward rotation of tire is stored in the computer 8. In this manner, the forward and backward LF values of the tire 1 are stored in the computer 8. Then, the computer 8 processes these LF values in the following manner to derive a signal for correcting LFV.

As explained above, the lateral force variation of the tire is produced by a factor in the causation of the lateral force and the tire has inherently the first-order time lag. Therefore, it is considered that the measured waveform of the lateral force is obtained by passing the factor waveform in the causation of the variation of the tire through the first-order delay element. That is to say, the measured waveform may be derived by multiplying the factor waveform with the transfer function $$G(s) = \frac{1}{1 + sT}$$

wherein T is the time constant of the first-order delay element and s is the complex variation in the LaPlace equation. Therefore, in order to derive the factor waveform from the measured LF waveform, the measured LF waveform may be transformed in the following manner, while the forward revolution is taken as a reference direction.

Now it is assumed that the lateral force variations in the forward and backward revolutions of tire are expressed as $LFV_F(t)$ and $LFV_B(t)$, respectively. These lateral force variations may be expressed by the following Fourier series.

$$LFV_F(t) = \sum_{n=1}^{\infty} (A_n \sin nt + B_n \cos nt) \quad (1)$$

$$LFV_B(t) = \sum_{n=1}^{\infty} (C_n \sin nt + D_n \cos nt) \quad (2)$$

wherein n is the number of order.

In the transformation through the first-order delay element, an amplitude ratio AMP and a phase $\phi$ may be represented as follows.

$$AMP_n = \frac{K}{\sqrt{1 + (nT)^2}} \quad (3)$$

$$\phi_n = -\tan^{-1}(nT) \quad (4)$$

In the inverse transformation, they may be expressed as follows.

$$AMP'_n = \sqrt{1 + (nT)^2} \quad (K = 1) \quad (5)$$

$$\phi'_n = \tan^{-1}(nT) \quad (6)$$

Therefore, when the measured waveforms of the forward and backward rotations represented by the equations ((1) and (2) are inversely transformed while the above amplitude ratio and phase are taken into account, the following equations may be obtained.

$$LFV'_F(t) = \sum_{n=1}^{\infty} \{(A_n - nT \cdot B_n)\sin nt + (nT \cdot A_n + B_n)\cos nt\} \quad (7)$$

$$LFV'_B(t) = \sum_{n=1}^{\infty} \{(C_n + nT \cdot D_n)\sin nt + (-nT \cdot C_n + D_n)\cos nt\} \quad (8)$$

The above equations (7) and (8) represent the lateral force variations in which the first-order time lag has been taken into account. The conicity component is derived as a half of a sum of $LFV_F'(t)$ and $LFV_B'(t)$, and the plysteer component is given by a half of a difference between $LFV_F'(t)$ and $LFV_B'(t)$.

As shown by the equations, the Fourier series generally includes higher order harmonics. However, in case of correcting the lateral force variation of the tire, it is practically sufficient to consider only the first harmonic. Therefore, in the present embodiment, only the first harmonic is taken into account. Further, during the measurement of LF, the tire is rotated at a constant speed, so that the time t may be replaced by an angle $\theta$ which is an angle measured along the circumference of the tire from a suitably determined reference position. Then, the equations (7) and (8) may be rewritten in the following manner.

$$LFV'_F = (A_1 - T \cdot B_1) \sin \theta + (T \cdot A_1 + B_1) \cos \theta \quad (9)$$

$$LFV'_B = (C_1 + T \cdot D_1) \sin \theta + (-T \cdot C_1 + D_1) \cos \theta \quad (10)$$

As explained above, the correction for LFV is to reduce the conicity component which does not depend upon the rotational direction of the tire, so that the factor waveform of conicity component $f(\theta)$ is derived from a half of the sum of the lateral force variations represented by the equations (9) and (10).

$$f(\theta) = \frac{1}{2}\{(A_1 + C_1 - T \cdot B_1 + T \cdot D_1)\sin\theta + (T \cdot A_1 + B_1 - T \cdot C_1 + D_1)\cos\theta\} \quad (11)$$

Now, the factor waveform in the causation of the lateral force may be generally expressed as follows.

$$f(\theta) = \frac{1}{2}(A\sin\theta + B\cos\theta) \quad (12)$$

$$A = A_1 + C_1 - T \cdot B_1 + T \cdot D_1 \quad (13)$$

$$B = T \cdot A_1 + B_1 - T \cdot C_1 + D_1 \quad (14)$$

In this manner, the factor waveform in the causation of the lateral force can be obtained, while the first-order time lag of the tire is taken into account. Then, an amount of rubber to be cut out of the tire X and a position $\Psi$ on the tire from which the tire is ground over 180° may be given by the following equations.

$$X = \sqrt{A^2 + B^2} \cdot \beta \quad (15)$$

$$\Psi = \tan^{-1}(B/A) \quad (16)$$

Figure 1:
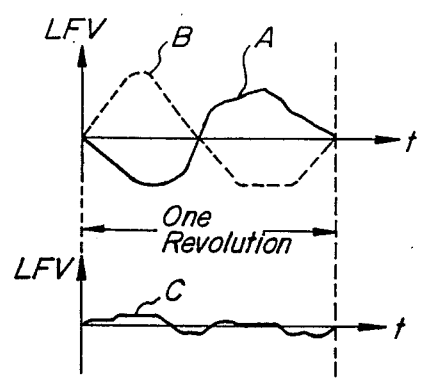
FIG. 1 is a graph showing the measured waveforms of LFV and a sum thereof.
Figure 3:
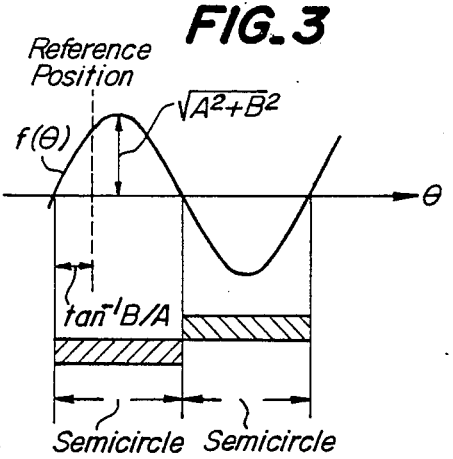
FIG. 3 is a graph depicting the relation between the factor waveform and the grinding operation in the method according to the invention.

FIG. 3 shows the factor waveform in the causation of the lateral force variation of the tire and the grinding amount X and grinding position $\Psi$.

The values of T and $\beta$ in the equations (13)–(15) may be determined experimentally. When the time constant T is set smaller than 0.5, an effect of considering the first-order time lag could not be obtained sufficiently, so that T is preferably set more than 0.5. In the present embodiment, T is set to 1.5. Then it has been confirmed that the LFV could be corrected efficiently. $\beta$ is the constant and can be previously determined by taking account of a relation between the amplitude of the factor waveform and an amount of rubber cut by the grinding and the specification of the grinding devices.

As explained above, the computer 8 derives the factor waveform f($\theta$) from the measured LF waveforms in the forward and backward rotations of the tire by taking into account the first-order time lag which the tire inherently has, and produces the LFV correction signal. The correction signal is then supplied to servo control devices 9 and 10 which drive grinding devices 11 and 12, respectively. As illustrated in FIG. 3, one of shoulders of the tire 1 is ground by one of the grinding devices 11 and 12 over a semicircle of the tire and the other shoulder is ground over the remaining semicircle with the aid of the other grinding device.

As explained above, there is the uni-directional tire whose rotational direction is specified. In such a unidirectional tire, it is meaningless to measure both the forward and backward LF waveforms and to derive the conicity component from these LF waveforms, and it is sufficient to correct LFV which is generated when the tire is rotated in the specified direction. In order to derive the first harmonic of the factor waveform from the LF waveform which is measured by rotating the tire in the specified direction, it is possible to set $C_1 = 0$ and $D_1 = 0$ in the equations (13) and (14). Then, the following equations may be obtained.

$$A = A_1 - T \cdot B_1 \quad (17)$$

$$B = T \cdot A_1 + B_1 \quad (18)$$

By introducing these values of A and B in the equations (15) and (16) it is possible to derive the grinding amount X and the grinding position $\Psi$. By controlling the grinding devices 11 and 12 in accordance with the thus derived grinding amount X and grinding position $\Psi$, LFV of the uni-directional tire can be corrected efficiently.

As shown by the equation (6), since $\Phi_n' = \tan^{-1}(nT)$, in the case of the uni-directional tire, $\Phi' = \tan^{-1} 1.5 = 56.3°$. That is to say, in the uni-directional tire, when only the first harmonic is considered, it is sufficient to grind the tire in accordance with the measured waveform by taking into account of the above phase difference $\Phi'$.

The present invention is not limited to the embodiments explained above, but many modifications and alternations may be conceived by those skilled in the art within the scope of the invention. In the above embodiment, the measured waveform is expanded in the Fourier series and only the first harmonic is corrected with respect to the first-order time delay, but it is also possible to derive the factor waveform in the causation of LFV by considering higher order harmonics in the Fourier series. When the higher order harmonics are taken into account, the precision of the correction could be further improved. However, it has been found that when the correction is carried out only by the first harmonic, it is practically possible to reduce the lateral force variation in a sufficient manner.

As explained above, in the method according to the invention the measured waveform of the lateral force of the tire is Fourier transformed by considering the first-order time lag which the tire has inherently and the factor waveform in the causation of the lateral force is derived from the Fourier series. Then, the grinding amount and grinding position are determined from the factor waveform. Therefore, the tire can be ground accurately corresponding to the factor waveform of the lateral force, so that the lateral force variation of the tire can be accurately and precisely reduced.

What is claimed is:

1. A method of reducing the lateral force variation of a tire comprising the steps of:
   rotating the tire at a constant velocity;
   detecting a lateral force of the tire over one revolution of the tire to derive a measured waveform of the lateral force of the tire;
   Fourier transforming the measured waveform of the lateral force to derive a Fourier series of the measured waveform of the lateral force of the tire;
   correcting the Fourier series of the measured waveform of the lateral force of the tire by taking into account a first-order time lag of the tire to derive a factor waveform in the causation of the lateral force of the tire;

determining a grinding amount and a grinding position from the factor waveform in the causation of the lateral force of the tire; and grinding the tire to cut off rubber from shoulders of the tire in accordance with the grinding amount and grinding position.

2. A method according to claim 1, wherein said factor waveform in the causation of the lateral force of the tire is derived from the first harmonic of the Fourier series.

3. A method according to claim 2, wherein said measured waveform of the lateral force of the tire is derived by detecting forward and backward lateral forces which are produced when the tire is rotated in forward and backward directions, respectively.

4. A method according to claim 2 wherein said measured waveform of the lateral force of a unidirectional tire is derived by detecting a lateral force of the tire which is produced when the uni-directional tire is rotated in a specified direction.

5. A method according to claim 2, wherein said step of correcting the Fourier series of the measured waveform of the lateral force of the tire includes transforming the first harmonic of the Fourier series of the measured waveform of the lateral force of the tire with the aid of the first-order time lag expressed by $1/1+sT$, wherein T is a time constant and s is the complex variation in the LaPlace transform.

6. A method according to claim 5, wherein T is set larger than 0.5.

7. A method according to claim 6, wherein T is set to 1.5.

8. A method of reducing the lateral force variation of a tire comprising the steps of:

detecting a lateral force of the tire over one revolution of the tire to derive a measured waveform of the lateral force of the tire;

converting the measured waveform of the lateral force of the tire into a factor waveform in the causation of the lateral force of the tire; and grinding the tire in accordance with said factor waveform in the causation of the lateral force of the tire.

9. A method according to claim 8, wherein said step for converting the measured waveform of the lateral force of the tire into the factor waveform in the causation of the lateral force of the tire is effected on the basis of a first-order time lag.

10. A method according to claim 8, wherein an amount of the rubber to be cut off the tire is determined from the factor waveform in the causation of the lateral force of the tire.

* * * * *